(12) United States Patent
Alqattan et al.

(10) Patent No.: US 12,159,394 B2
(45) Date of Patent: Dec. 3, 2024

(54) SYSTEM AND METHOD FOR ORIENTING GEOLOGICAL CORE SAMPLES

(71) Applicant: Saudi Arabian Oil Company, Dhahran (SA)

(72) Inventors: Hussain Ali Alqattan, Hofuf (SA); Mokhles Mezghani, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 392 days.

(21) Appl. No.: 17/453,590

(22) Filed: Nov. 4, 2021

(65) Prior Publication Data

US 2023/0135710 A1   May 4, 2023

(51) Int. Cl.
  *G06T 7/00*   (2017.01)
  *G06T 7/70*   (2017.01)

(52) U.S. Cl.
  CPC ............ *G06T 7/001* (2013.01); *G06T 7/70* (2017.01)

(58) Field of Classification Search
  CPC .. G06T 7/001; G06T 7/70; G06T 7/00; G06T 7/246; G06T 7/248; G06T 7/73; G06T 7/74; G06T 7/97; G06T 7/30; G06T 7/33
  See application file for complete search history.

(56) References Cited

U.S. PATENT DOCUMENTS

| | | | |
|---|---|---|---|
| 3,059,707 A | 10/1962 | Frisby | |
| 5,277,062 A | 1/1994 | Blauch et al. | |
| 5,335,724 A | 8/1994 | Venditto et al. | |
| 9,146,200 B2 | 9/2015 | Zarra | |
| 9,625,656 B2 | 4/2017 | Sasaki et al. | |
| 10,235,760 B2 | 3/2019 | Monteiro et al. | |
| 11,049,267 B2 | 6/2021 | Selviah et al. | |
| 2009/0080705 A1* | 3/2009 | Orpen | G01N 33/24 382/109 |

(Continued)

FOREIGN PATENT DOCUMENTS

| | | |
|---|---|---|
| WO | 2010096861 A1 | 9/2010 |
| WO | 2017123196 A1 | 7/2017 |

(Continued)

OTHER PUBLICATIONS

AAPG Wiki; Core Orientation; https://wiki.aapg.org/Core_orientation; Dec. 2015.

(Continued)

*Primary Examiner* — Edward F Urban
*Assistant Examiner* — Duy Tran
(74) *Attorney, Agent, or Firm* — Leason Ellis LLP

(57) ABSTRACT

A system and method automatically orient geological core samples. The system comprises a camera, a core analyzer module, and a core sample rotation apparatus. The camera is configured to capture a reference image of a cross-section of a reference core sample from a well and to capture a sample image of a cross-section of the to-be-oriented core sample from the well. The core analyzer module comprises code executable in a hardware processor to process the sample image to substantially match the reference image, and to determine an orientation angle of the match. The core sample rotation apparatus is configured to orient the to-be-oriented core sample by the orientation angle. A method comprises steps performed during operation of the system.

8 Claims, 5 Drawing Sheets

(56) References Cited

U.S. PATENT DOCUMENTS

| | | | | |
|---|---|---|---|---|
| 2010/0282516 | A1* | 11/2010 | Buchanan | E21B 49/06 175/58 |
| 2012/0262474 | A1* | 10/2012 | Jancourtz | G06T 3/4007 345/592 |
| 2014/0126786 | A1* | 5/2014 | Yu | G06V 10/242 382/128 |
| 2018/0106708 | A1 | 4/2018 | Siebrits et al. | |
| 2019/0010802 | A1 | 1/2019 | Parfitt | |
| 2021/0063325 | A1 | 3/2021 | Drenzek | |

FOREIGN PATENT DOCUMENTS

| | | | | |
|---|---|---|---|---|
| WO | WO-2020222757 | A1 * | 11/2020 | G06T 17/00 |
| WO | 2020244795 | A1 | 12/2020 | |

OTHER PUBLICATIONS

Alstine et al., "Paleomagneti core-orientation for charecterizing reservoir anisotropy: Case histories from fractured reservoirs in Abu Dhabi and Venezuela", AAPG Bulletin (American Association of Petroleum Geologists), Mar. 1991.

Dalrymple et al., "A Methodology for Determining Orientations in Unscribed Core", Journal of Sedimentary Research, May 2017, 87(5), 517-522.

Murphy et al., " Core analysis and its application in reservoir characterization", In Developments in Petroleum Science, Jan. 1996, vol. 44, pp. 105-153. Elsevier.

Stigsson, "Orientation uncertainty of structures measured in cored boreholes: methodology and case study of Swedish crystalline rock", Rock Mechanics and Rock Engineering, Jun. 2016, 49(11), 4273-4284.

McCall et al., "Data report: Orientation correction of Chicxulub core recovered from IODP/ICDP Expedition 364", Proceedings of the International Ocean Discovery Program, Apr. 2020.

Paulsen et al., "A simple method for orienting drill core by correlating features in whole-core scans and oriented borehole-wall imagery", Journal of Structural Geology, Aug. 2002, 24(8), 1233-1238.

Mathis et al., "Orientation and calibration of core and borehole image data", In SPWLA 36th Annual Logging Symposium, Jun. 1995.

McClellan, "Core Orientation by Graphical and Mathematical Methods", AAPG Bulletin, Feb. 1948, 32(2), 262-277.

MacReady, "Orientation of cores", AAPG Bulletin, May 1930, 14(5), 559-578.

Nelson, "Oriented core: its use, error, and uncertainty" AAPG bulletin, Apr. 1987, 71(4), 357-367.

"Recommended Practices for Core Analysis", American Petroleum Institute, Recommended Practice 40 Second Edition, Feb. 1998.

Kim et al., "Stress Estimation through Deep Rock Core Diametrical Deformation and Joint Roughness Assessment Using Xray CT Imaging", Sensors, Nov. 2020.

Sturzenegger, "Multi-Scale Characterization of Rock Mass Discontinuities and Rock Slope Geometry Using Terrestrial Remote Sensing Techniques", Abstract Only (Doctoral dissertation, Science: Department of Earth Sciences), Jan. 2010.

* cited by examiner

SYSTEM AND METHOD FOR ORIENTING GEOLOGICAL CORE SAMPLES

FIELD OF THE DISCLOSURE

The present disclosure relates generally to geological core samples, and, more particularly, to a system and method for automatically orienting geological core samples.

BACKGROUND OF THE DISCLOSURE

During geologic exploration such as in the oil and gas industry, core samples are obtained from wells. Such core samples can be indexed, examined, and divided into separate core samples. During such examination and division, the orientation of adjacent core samples can be lost. Absolute core orientation is the process of determining the original orientation angle of a rock core in reference to a reference core or to a standard orientation, such as geographic north. The orientation process can be done during coring using mechanical techniques, or by examining the core using core-based techniques. Such orientation processes can be subjective in matching features of core cross-sections, and can be prone to error.

SUMMARY OF THE DISCLOSURE

According to an embodiment consistent with the present disclosure, a system and method automatically orient geological core samples.

In an embodiment, the system for orienting a core sample comprises a camera, a core analyzer module, and a core sample rotation apparatus. The camera is configured to capture a reference image of a cross-section of a reference core sample from a well, and to capture a sample image of a cross-section of the to-be-oriented core sample from the well. The core analyzer module comprises code executable in a hardware processor to process the sample image to substantially match the reference image, and to determine an orientation angle of the match. The core sample rotation apparatus is configured to orient the to-be-oriented core sample by the orientation angle.

The system further comprises a memory, and the core analyzer module processes the sample image by flipping the sample image within the memory about a diametric axis to obtain a flipped sample image. The core analyzer module processes the sample image by incrementally rotating the flipped sample image within the memory until the code executing in the hardware processor identifies the flipped sample image as substantially matching the reference image. The core analyzer module is configured by code to measure a mis-fit metric of the rotated flipped sample image relative to the reference image. The sample image substantially matches the reference image when the mis-fit metric is less than a predetermined threshold. Alternatively, the sample image substantially matches the reference image when the mis-fit metric is minimized. The orientation angle corresponds to the minimized mis-fit metric.

In another embodiment, a core analyzer comprises an input device and a hardware processor. The input device is configured to receive a reference image of a cross-section of a reference core sample from a well and a sample image of a cross-section of a to-be-oriented core sample from the well. The hardware processor has code therein which configures the hardware processor to process the sample image to substantially match the reference image, to determine an orientation angle of the match, and to control rotation of the to-be-oriented core sample in a core sample rotation apparatus by the orientation angle.

The core analyzer further comprises a memory, and the hardware processor flips the sample image within the memory about a diametric axis to obtain a flipped sample image. The hardware processor is further configured by the code therein to incrementally rotate the flipped sample image within the memory until the flipped sample image substantially matches the reference image. The hardware processor is further configured by the code therein to measure a mis-fit metric of the rotated flipped sample image relative to the reference image. The sample image substantially matches the reference image when the mis-fit metric is less than a predetermined threshold. Alternatively, the sample image substantially matches the reference image when the mis-fit metric is minimized. The orientation angle corresponds to the minimized mis-fit metric.

In a further embodiment, a method for orienting a core sample from a well comprises receiving, from a camera, a reference image of a cross-section of a reference core sample from the well, and then receiving, from the camera, a sample image of a cross-section of a to-be-oriented core sample from the well. The method then processes the sample image using a hardware processor with code executing therein to substantially match the reference image, and the method determines an orientation angle of the match, and controls rotation of the to-be-oriented core sample in a core sample rotation apparatus by the orientation angle. The processing includes flipping the sample image about a diametric axis within a memory which is in communication with the hardware processor to obtain a flipped sample image. The processing includes incrementally rotating the flipped sample image within the memory until the flipped sample image substantially matches the reference image. The processing includes measuring a mis-fit metric of the rotated flipped sample image relative to the reference image. The sample image substantially matches the reference image when the mis-fit metric is minimized. The orientation angle corresponds to the minimized mis-fit metric.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION OF CERTAIN EMBODIMENTS OF THE DISCLOSURE

Example embodiments consistent with the teachings included in the present disclosure are directed to a system 10 and method 100 for automatically orienting geological core samples.

Figure 1:
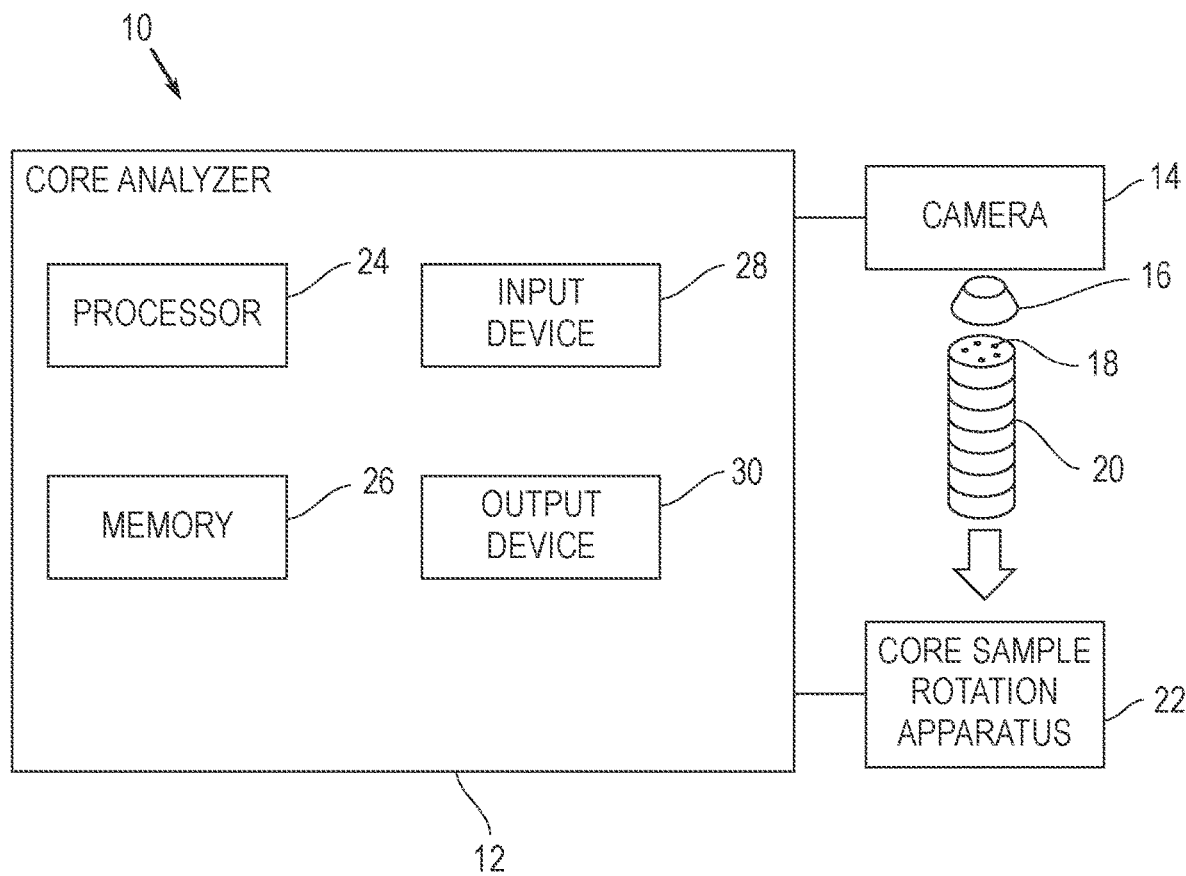
FIG. 1 is a schematic of a system, according to an embodiment.

As shown in FIG. 1, the system 10 includes a core analyzer module 12, a camera 14 with a field of view (FoV) 16 directed to a cross-section 18 of a core sample 20, and a core sample rotation apparatus 22. The camera 14 captures any features of the exposed two-dimensional core surface at the cross-section 18. The core analyzer module 12 includes a hardware processor 24, a memory 26, an input device 28, and an output device 30. The hardware processor 24 can be a microprocessor. The input device 28 can be a communication interface configured to receive images from the camera 14. Alternatively, the input device 28 can be a keyboard, mouse, or other known input devices accessible by a user. The output device 30 can be a display configured to display an image, such as the images provided by the camera 14, as well as images modified by the processor 24, as described below. The core sample rotation apparatus 22 can receive a to-be-oriented core sample 20. The core sample rotation apparatus 22 can then rotate the core sample 20 by any angle, such as an orientation angle as described below. The core sample rotation apparatus 22 can be the apparatus described in U.S. Patent Publication No. US 2021/0063325 A1, which is incorporated herein by reference.

Figure 2:
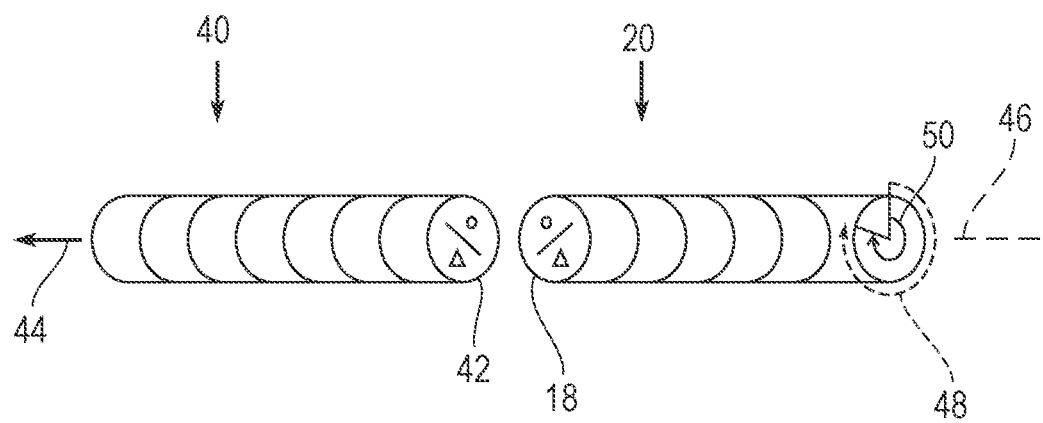
FIG. 2 illustrates two core samples.

Referring to FIG. 2, the input device 28 is configured to receive a reference image of a cross-section 42 of a reference core sample 40 from a well and a sample image of the cross-section 18 of the to-be-oriented core sample 20 from the well. The images or live-feed of the cross-sections 18, 42 are the axial top or bottom of the respective core samples 20, 40 captured by the camera 14. As described in greater detail below, the hardware processor 24 has code therein which configures the hardware processor 24 to process the sample image to substantially match the reference image, to determine an orientation angle of the match, and to control rotation of the to-be-oriented core sample 20 in the core sample rotation apparatus 22 by the orientation angle.

Referring again to FIG. 2, the core sample 20 and the reference core sample 40 can have a common longitudinal axis 44. Alternatively, the reference core sample 40 has the longitudinal axis 44, while the core sample 20 has an axis 46 of rotation. The axes 44, 46 can be aligned. During rotation of the core sample 20 by the core sample rotation apparatus 22, the core sample 20 rotates about the axis 46 along the rotation path 48. The core sample 20 can be rotated to at any angle 50.

Figure 3:
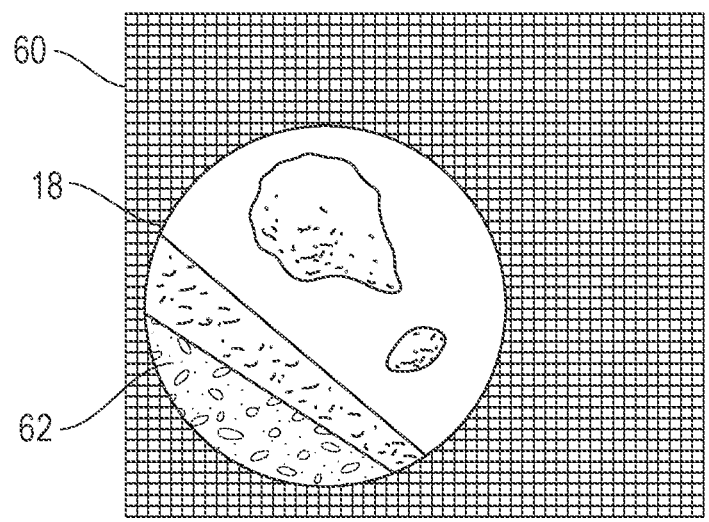
FIG. 3 illustrates a camera image of a core sample.
Figure 4:
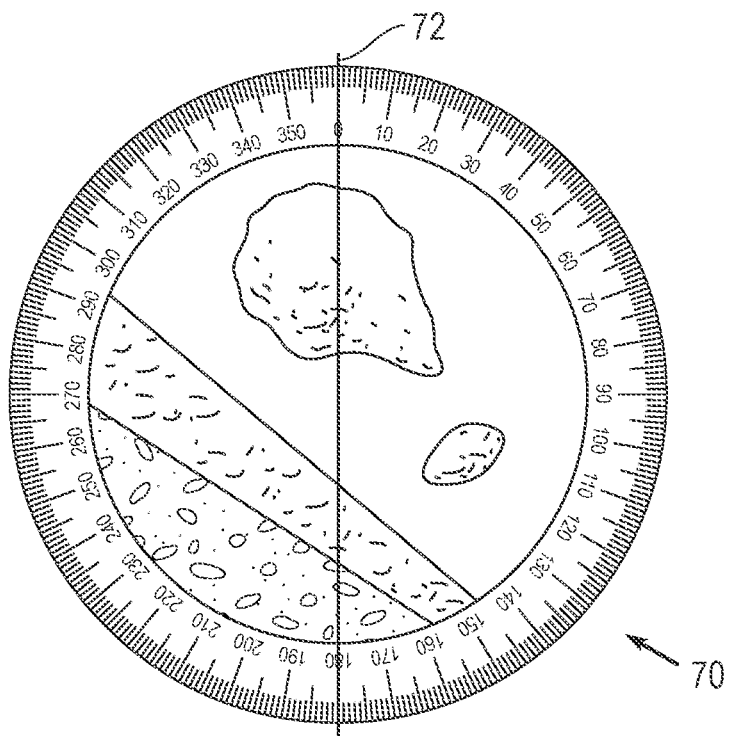
FIG. 4 illustrates an image of the core sample of FIG. 3.

Referring to FIG. 3, the hardware processor 24 obtains an image 60 from the camera 14 having a sub-image 62 showing the cross-section 18 of the core sample 20. The hardware processor 24 processes the image 60 and sub-image 62 in the memory 26 to remove background pixels, and to only consider the axial cross-sections 18, 42 of the two cores 20, 40 as circles. Referring to FIG. 4, the sub-image 62 is processed in the memory 26 by the hardware processor 24. The sub-image 62 is then modified in the memory 26 by the hardware processor 24 to include an annular indexing by, for example, single degrees of arc, configured as an annular protractor. The sub-image 62 and the indexing form a processed image 70 in the memory 26. The processed image 70 can have a diametric axis 72 extending through the 0° and 180° marks.

Figure 5:
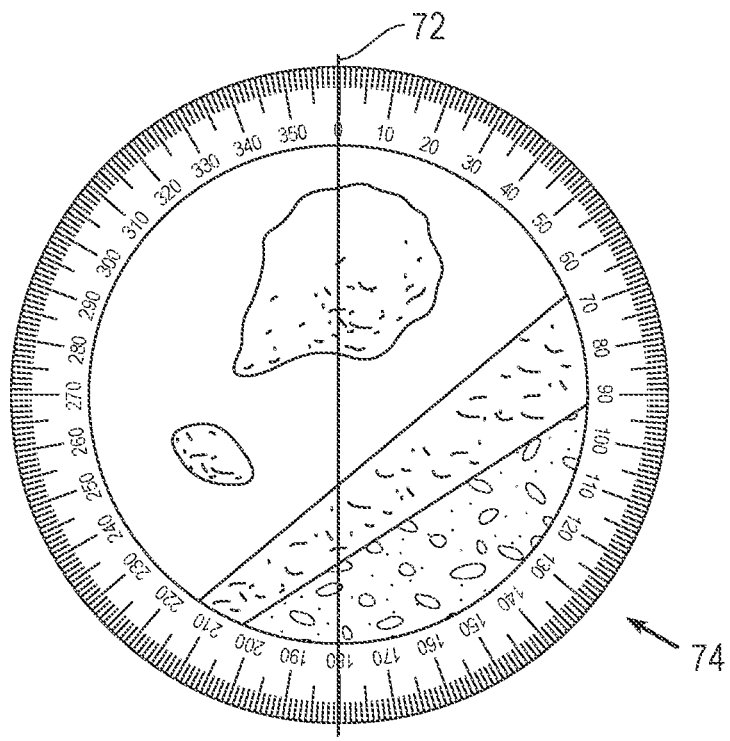
FIG. 5 illustrates a flipped image of the core sample of FIG. 3.
Figures 6, 6A:
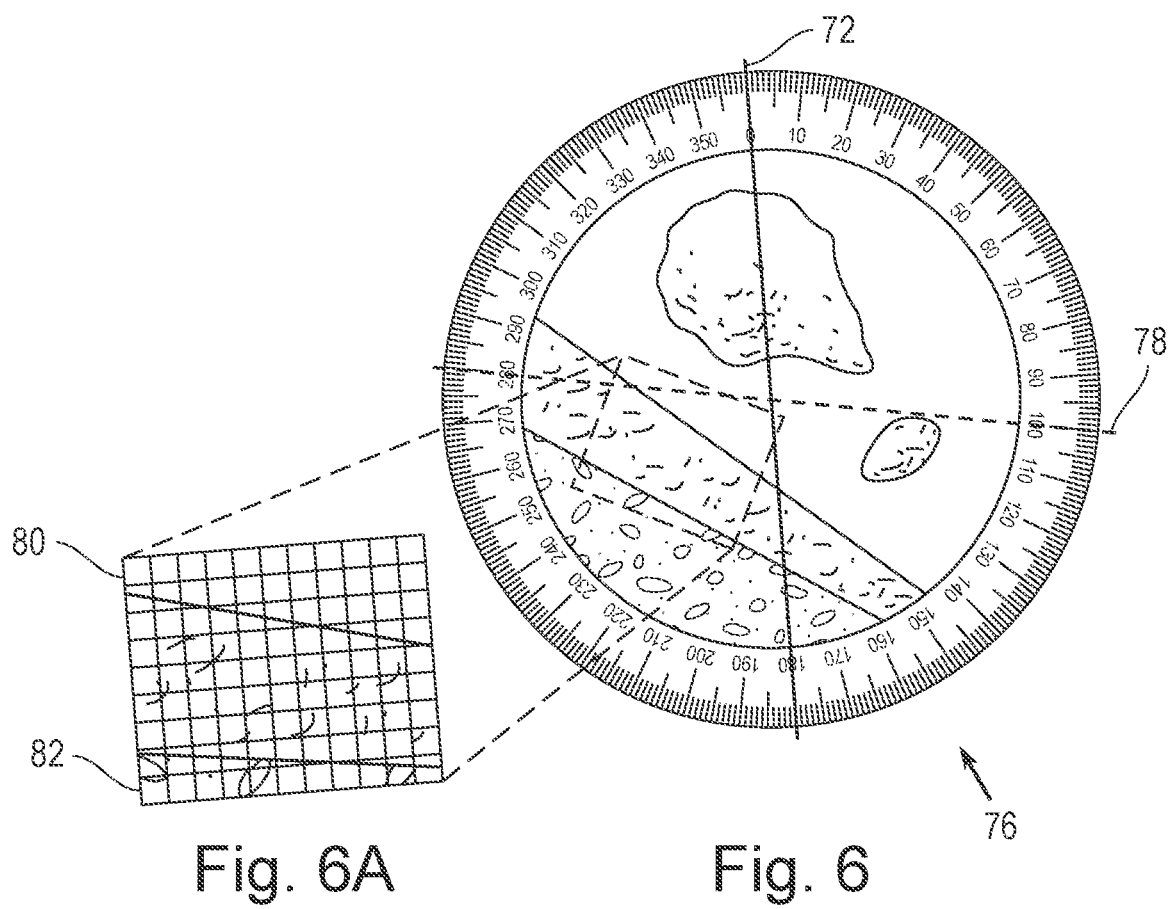
FIG. 6 illustrates an oriented flipped image of the core sample of FIG. 3.
FIG. 6A illustrates a selection of pixels from a processed image of a core sample.

Referring to FIG. 5, the hardware processor 24 flips the processed image in the memory 26 about the diametric axis 72 to obtain a flipped sample image 74 stored in the memory 26. The flipping is performed to generally orient the features of the sample image 60 from the cross-section 18 with the reference image of the cross-section 42, since the cross-section 18 is substantially a mirror version the reference cross-section 42. Referring to FIG. 6, the hardware processor 24 is further configured by the code therein to incrementally rotate the flipped sample image in the memory 26 to form a rotated image 76 until the flipped sample image substantially matches the reference image when a matching angle 78 is attained. As shown in FIG. 6A, a selected section of the rotated and flipped core image 76 is enlarged to show the individual pixels 80, 82, and each square-shaped pixel has different information assigned to it, such as RGB values, intensity, etc.

Figure 7:
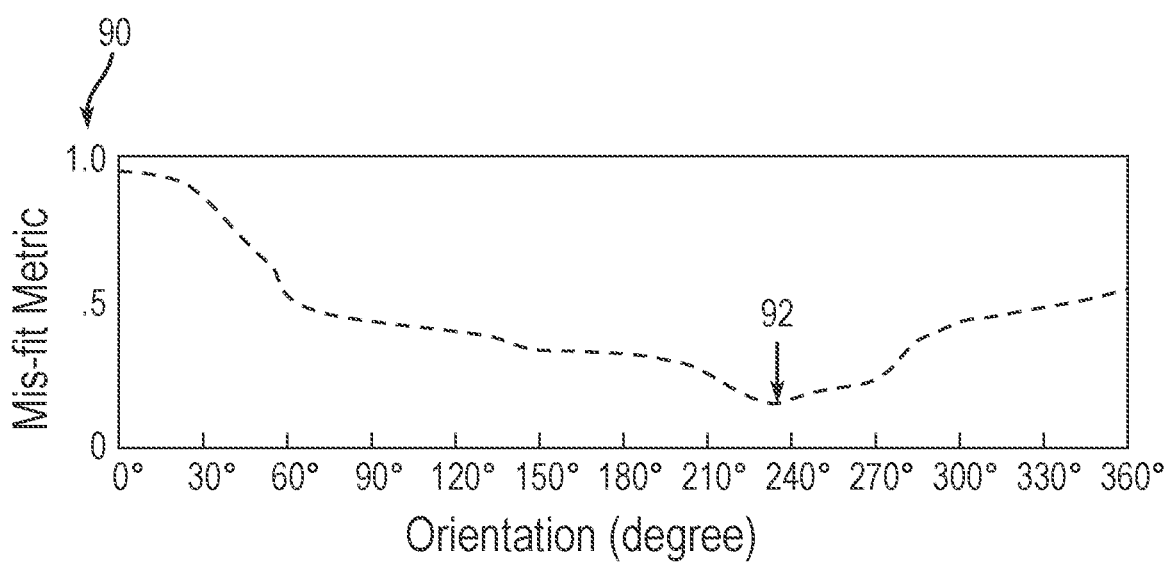
FIG. 7 illustrates a graph of a mis-fit metric plotted with reference to an orientation angle.

The hardware processor 24 is further configured by the code therein to measure a mis-fit metric of the rotated flipped sample image relative to the reference image. The mis-fit metric can be an inverse of a correlation metric since a correlation metric measures agreement or matching while a mis-fit metric measures a degree of non-matching. The mis-fit metric can be calculated by any known method, such as a Pearson correlation coefficient, a cosine similarity, an absolute mean difference, an absolute cumulative difference, etc. As shown in FIG. 7, the mis-fit metric versus the orientation angle of rotation of the flipped sample can be displayed as a graph output by the output device 30. The sample image substantially matches the reference image when the mis-fit metric is less than a predetermined threshold. For example, the predetermined threshold can be 0.1. Using the input device 28, a user can enter a customized threshold. Alternatively, the sample image substantially matches the reference image when the mis-fit metric is minimized, such as at point 92 on the graph shown in FIG. 7 corresponding to, for example, an orientation angle of about 230°. The orientation angle for the to-be-rotated core 20 corresponds to the minimized mis-fit metric. The orientation angle refers to the adjustment magnitude of the angle of one core around its main axis needed to fit another core. The core sample rotation apparatus 22 is configured to orient the to-be-oriented core sample 20, inserted into the core sample rotation apparatus 22, by the orientation angle. Once the hardware processor 24 determines the orientation angle, the hardware processor 24 sends a control signal to the core sample rotation apparatus 22 to rotate the inserted core sample 20 to the orientation angle. The reorientation process described herein does not align external features to the two cores 20, 40. Instead, the reorientation process determines the relative orientation of two cores, at a time, to each other. In addition, the absolute orientation of the reference core 40 does not have to be known. If, however, the absolute orientation of the reference core 40 in space is known, then the system 10 can be used to reorient the unoriented core 20 to the reference core 40, and hence to extrapolate the absolute orientation information to the unoriented core 20.

Figure 8:
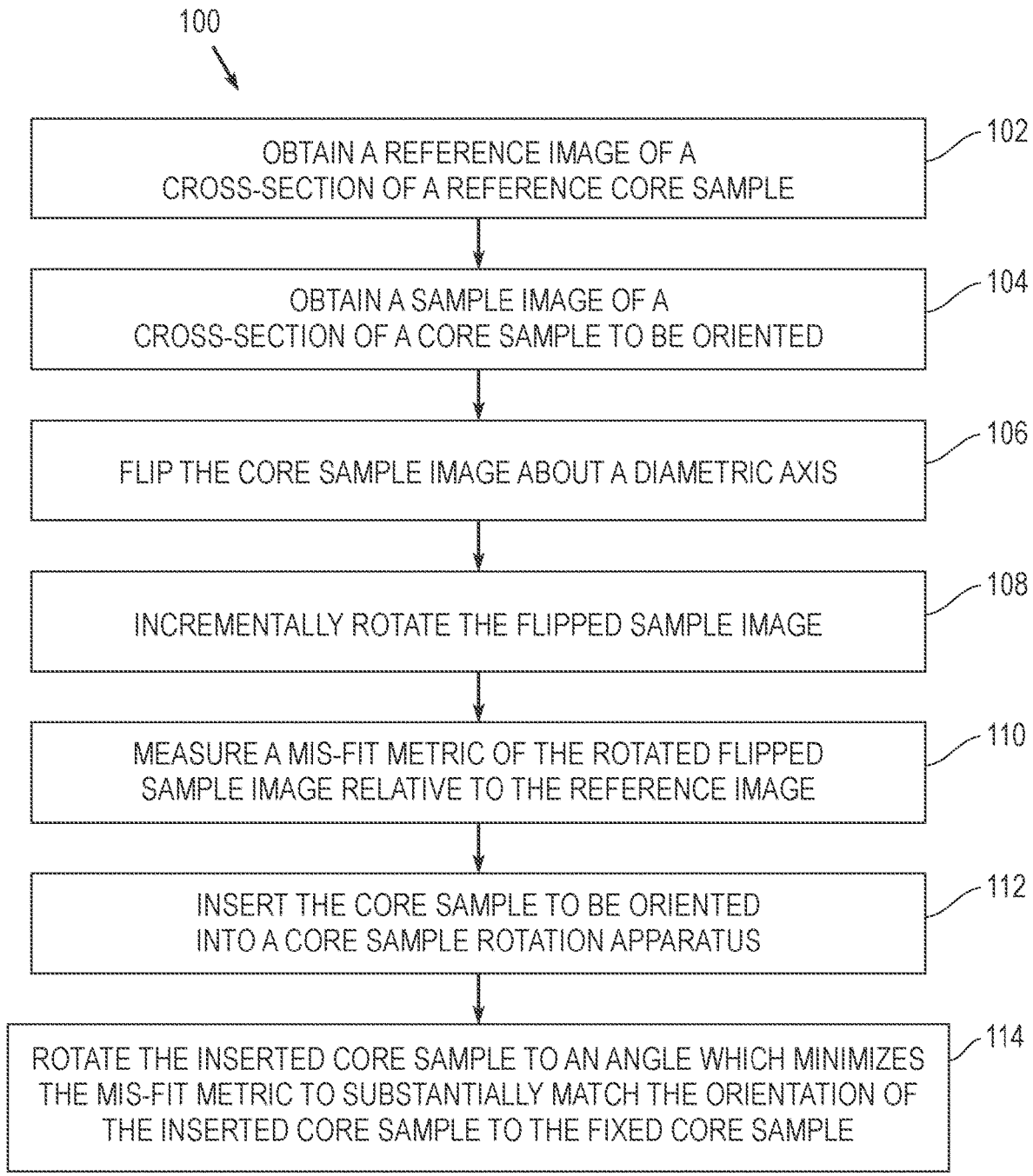
FIG. 8 is a flowchart of a method of operation of the system.

As shown in FIG. 8, the method 100 for orienting a core sample from a well comprises obtaining, from the camera 14, the reference image of the cross-section 42 of the reference core sample 40 from the well in step 102. The images, once obtained, are maintained in a memory which is communication with the hardware processor. The method 100 includes the step of receiving, from the camera 14, the sample image of the cross-section 18 of the to-be-oriented core sample 20 from the well in step 104. This sample image is also maintained in the memory. The method 100 then flips the core sample image about the diametric axis 72 in step 106, incrementally rotates the flipped sample image in step 108, and measures a mis-fit metric of the rotated flipped sample image relative to the reference image in step 110. The flip and measurement of the mis-fit metric are done by manipulating the image data included in the memory under control of the hardware processor which is executing code that configures the processor for these two purposes. The method 100 then inserts the to-be-oriented core sample 20 into the core sample rotation apparatus 22 in step 112, and the inserted core sample is rotated in step 114 to an angle which minimizes the mis-fit metric to substantially match the orientation of the inserted core sample to the fixed reference core sample.

Portions of the methods described herein can be performed by software or firmware in machine readable form on a tangible (e.g., non-transitory) storage medium. For example, the software or firmware can be in the form of a computer program including computer program code adapted to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for orienting a geological core sample, comprising:
    a memory;
    a camera configured to capture a reference image of an exposed two-dimensional surface at the top or bottom of the cross-section of a reference core sample from a well, and to capture a sample image of an exposed two-dimensional surface at the top or bottom of the cross-section of the geological core sample from the well;
    a core analyzer module comprising code executable in a hardware processor to process the sample image by flipping the sample image within the memory about a diametric axis to obtain a flipped sample image, by incrementally rotating the flipped sample image within the memory, and by measuring a mis-fit metric of the rotated flipped sample image relative to the reference image until the code executing in the hardware processor identifies the flipped sample image as substantially matching the reference image, wherein the sample image substantially matches the reference image when the mis-fit metric is minimized, and to determine an orientation angle of the match; and
    a core sample rotation apparatus configured to orient the geological core sample by the orientation angle.

2. The system of claim 1, wherein the sample image substantially matches the reference image when the mis-fit metric is less than a predetermined threshold.

3. The system of claim 1, wherein the orientation angle corresponds to the minimized mis-fit metric.

4. A core analyzer, comprising:
    a memory;
    an input device configured to receive a reference image of an exposed two-dimensional surface at the top or bottom of the cross-section of a reference core sample from a well and to receive a sample image of an exposed two-dimensional surface at the top or bottom of the cross-section of a geological core sample from the well; and
    a hardware processor having code therein which configures the hardware processor to process the sample image by flipping the sample image within the memory about a diametric axis to obtain a flipped sample image, by incrementally rotating the flipped sample image within the memory, and by measuring a mis-fit metric of the rotated flipped sample image relative to the reference image until the code executing in the hardware processor identifies the flipped sample image as substantially matching the reference image, wherein the sample image substantially matches the reference image when the mis-fit metric is minimized, to determine an orientation angle of the match, and to control rotation of the geological core sample in a core sample rotation apparatus by the orientation angle.

5. The core analyzer of claim 4, wherein the sample image substantially matches the reference image when the mis-fit metric is less than a predetermined threshold.

6. The core analyzer of claim 4, wherein the orientation angle corresponds to the minimized mis-fit metric.

7. A method for orienting a geological core sample from a well, comprising:

receiving, from a camera, a reference image of an exposed two-dimensional surface at the top or bottom of the cross-section of a reference core sample from the well;

receiving, from the camera, a sample image of an exposed two-dimensional surface at the top or bottom of the cross-section of a geological core sample from the well;

processing the sample image using a hardware processor with code executing therein to substantially match the reference image, including:

flipping the sample image about a diametric axis within a memory which is in communication with the hardware processor to obtain a flipped sample image;

incrementally rotating the flipped sample image within the memory until the flipped sample image substantially matches the reference image; and measuring a mis-fit metric of the rotated flipped sample image relative to the reference image, wherein the sample image substantially matches the reference image when the mis-fit metric is minimized;

determining an orientation angle of the match; and controlling rotation of the geological core sample in a core sample rotation apparatus by the orientation angle.

8. The method of claim 7, wherein the orientation angle corresponds to the minimized mis-fit metric.

* * * * *